June 11, 1968 R. A. ESSIG 3,387,623

TWO STAGE CHECK VALVE

Filed March 31, 1966

WITNESSES
Theodore F. Wrobel
James F. Young

INVENTOR
Robert A. Essig
BY
Francis E. Blake
ATTORNEY

United States Patent Office 3,387,623
Patented June 11, 1968

3,387,623
TWO STAGE CHECK VALVE
Robert A. Essig, Elyria, Ohio, assignor to Luxaire, Inc., Elyria, Ohio, a corporation of Delaware
Filed Mar. 31, 1966, Ser. No. 539,119
4 Claims. (Cl. 137—512.1)

The present invention relates to valves and more particularly to fluid pressure check valve structures.

Fluid pressure check valve structures that are automatically operable from valve open to valve closed positions in response to changes in direction of fluid flow are of course well known. It has been recently found desirable to provide what may be defined as a two stage pressure differential fluid pressure check valve that is automatically operable to be open in response to fluid flow of any appreciable pressure in one direction and to be partly closed in response to fluid flow of relatively low pressure in the other direction and to be fully closed in response to fluid flow of relatively high pressure in the other direction.

It is a principal object of the present invention to provide a two stage pressure differential check valve having the desired characteristics enumerated above.

In accordance with the invention, the two-stage check valve is comprised of a valve body having a fixed valve seat, a movable valve seat, and a movable valve diaphragm, together with an arrangement of bypass perforations or openings in the diaphragm member and movable valve seat such that when the diaphragm mebber is moved to be seated against the movable valve seat only for a partly closed valve condition in response to fluid flow under relatively low pressure in one direction against the diaphragm member, the valve will be partly closed and fluid will flow at a reduced rate through the bypass perforations of the diaphragm and movable valve seat members. As the fluid pressure in the one direction against the movable diaphragm increases to a relatively higher amount, the diaphragm member together with the movable valve seat are moved until the diaphragm member is seated against the fixed valve seat for the valve closed position in a manner to thereby close the perforations of the diaphragm and the movable valve seat against the passage of fluid thus establishing a fully closed valve condition. Fluid flow of any appreciable pressure in the other direction against the diaphragm member causes the diaphragm member to move away from both the fixed and movable valve seats and the valve is thus automatically in the fully open condition.

Further objects, features and the attendant advantages of the invention will be apparent with reference to the following specification and drawing in which.

Figure 1:
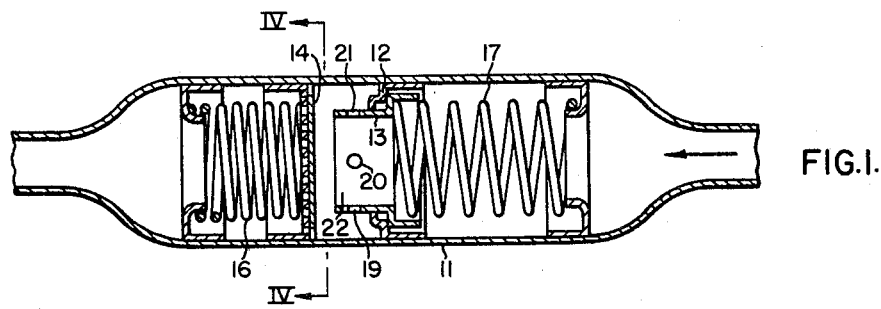
FIGURE 1 is a sectional view of the differential pressure responsive check valve of the invention with the valve shown in the fully open condition.

Referring to the drawing, a preferred embodiment of differential pressure responsive check valve of the invention is shown to include a tubular body portion 11 having a fixed valve seat 12 secured transversely within the body portion in any suitable manner as shown. A movable valve seat member 13 which is a generally tubular member is movably positioned within the opening of the fixed valve seat 12. A movable valve diaphragm 14 is also mounted transversely within the valve body 11 as shown to be movable from the valve open condition shown by FIG. 1 of the drawing to the partly closed valve condition engaging the movable valve seat 13 only as shown by FIG. 2 of the drawing and to the fully closed valve condition engaging both the fixed valve seat 12 with the movable valve seat 13 retracted as shown by FIG. 3 of the drawing.

Figure 4:
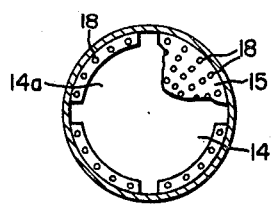
FIG. 4 is a section view taken on line IV—IV of FIG. 1.

As shown more clearly by FIG. 4 of the drawing the movable diaphragm member 14 may be comprised of a central imperforate diaphragm portion 14A together with a peripheral portion having a plurality of perforations or openings such as shown at 18. Although the invention is not to be limited to the precise structure of the movable diaphragm member 14, the structure as shown may actually comprise a perforated screen member 15 for supporting the central imperforate diaphragm element 14A.

Figure 2:
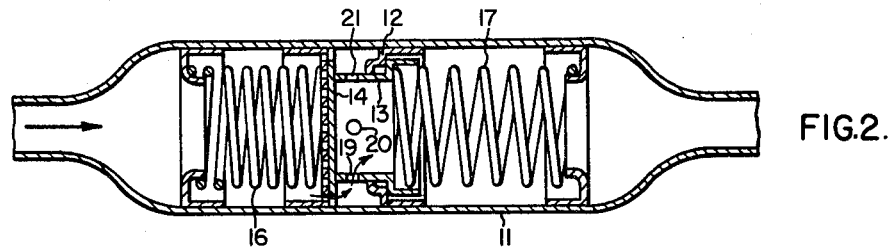
FIG. 2 is a view similar to FIG. 1 but showing the valve in the partly closed condition.

The movable tubular valve seat 13 is provided with a number of perforations or openings 19–21 through the tubular wall near one end thereof and a spring 17 is provided to normally urge the movable tubular valve seat 13 to the position shown by FIGS. 1 and 2 of the drawing. So long as the fluid flow of any appreciable pressure is in the direction of the arrow shown by FIG. 1 of the drawing against one side of the movable diaphragm member 14 the diaphragm 14 will be moved away from both the movable valve seat 13 and the fixed valve seat 12 against the force of spring 16 and the valve is in the fully open condition.

Figure 3:
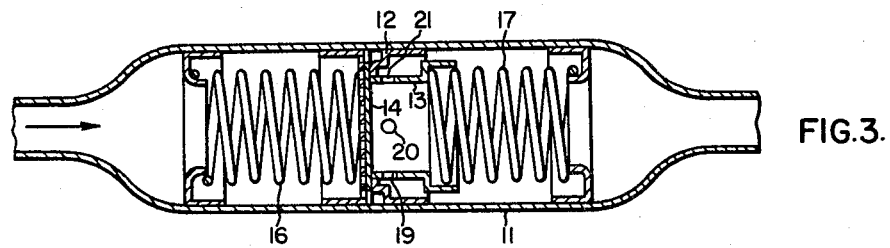
FIG. 3 is a view similar to FIG. 1 but showing the valve in the fully closed condition.

Upon reversal of fluid flow in the direction of the arrows shown by FIGS. 2 and 3 of the drawing against the other side of the diaphragm member 14 will be moved to either the partly closed valve position of FIG. 2 in response to fluid pressure of relatively low amounts or to the valve closed position of FIG. 3 in response to fluid pressure of relatively high amounts. More particularly, as shown by FIG. 2 of the drawing, a relatively low fluid pressure in the direction of the arrow will seat the movable diaphragm member 14 with its central diaphragm member 14A against the movable valve seat 13 only for closing the main tubular valve seat opening 22 and fluid will therefore flow at reduced rates through only the perforations 18 of the diaphragm member and the bypass perforations 19–21 of the movable tubular valve seat member.

Should the fluid pressure in the direction of the arrow of FIGS. 2 and 3 increase to a relatively high amount, the movable diaphragm member 14 will have additional movement and cause the movement of the movable valve seat 13 against the tension of the spring 17 to thereby seat the diaphragm 14 with its central portion engaging both the valve seats 12 and 13 in the fully closed valve position. Thus, the bypass perforations 19–21 are closed and fluid flow in the direction of the arrow of FIG. 3 is prevented.

The spring 16 may be provided if desired to assist in the movement of the movable valve diaphragm 14 in response to fluid flow in the direction of the arrows of FIGS. 2 and 3 of the drawing. However, it should be obvious that the provision of the spring 16 is not essential and that the parameters of the tensions for the springs 16 and 17 together with the numbers of bypass openings in the movable diaphragm member 14 and the movable tubular valve seat 13 are a matter of choice depending on the desired operating characteristics of the two stage pressure differential check valve of the invention. It will be noted however that the total area of openings 19, 20 and 21 is less than the area of the main tubular opening 22 of the tubular movable valve seat 13 so as to provide the partially closed valve condition of FIG. 2 which is less open than the fully open valve condition shown by FIG. 1 of the drawing.

Various modifications may be made within the spirit of the invention.

I claim as my invention:

1. A two stage pressure differential check valve comprising, a valve body, a fixed valve seat having an opening therethrough and positioned transversely within said body, a movable tubular valve seat extending through said fixed valve seat opening and having a main tubular opening together with one or more bypass openings through the tubular wall thereof, means normally urging said tubular seat to a first position with the plane of its seat spaced from the plane of the fixed valve seat and its tubular wall openings between both valve seat planes on one side of said fixed valve seat, said tubular valve seat being movable to a second position with the plane of its valve seat in alignment with the plane of the fixed valve seat and its tubular wall openings on the other side of said fixed valve seat, a diaphragm valve member having a central imperforate diaphragm portion and a peripheral portion having a plurality of openings therethrough, said valve member being positioned transversely within said valve body opposite said valve seats to be movable from a position for open valve condition which is out of engagement with both of said valve seats while said tubular valve seat is in its first position in response to fluid flow of any appreciable pressure in one direction against one side of said diaphragm member, said valve member being movable to a position with its central diaphragm portion engaging said tubular valve seat to close the main tubular opening thereof while said tubular valve seat is in its first position to provide a partly closed valve condition for fluid flow through the tubular wall bypass openings in response to fluid flow of relatively low pressure in the other direction against the other side of said diaphragm member, and said valve member together with said tubular seat being movable to positions with the central diaphragm portion of the valve member engaging both of said valve seats while the tubular member is in its second position to provide a fully closed check valve condition in response to fluid flow of relatively high pressure in the other direction against the other side of said diaphragm member.

2. The invention of claim 1 in which said means for normally urging said movable valve seat to its first position is comprised of a spring calibrated to establish a predetermined differential between the relatively low fluid pressure in the other direction causing the partly closed valve condition and the relatively high fluid pressure in the other direction causing the fully closed valve condition.

3. The invention of claim 2 in which the total area of the bypass openings through the tubular wall of said movable valve seat is less than the total area of the main opening through the tubular valve seat.

4. The invention of claim 1 in which the total area of the bypass openings through the tubular wall of said movable valve seat is less than the total area of the main opening through the tubular valve seat.

References Cited

UNITED STATES PATENTS

| 94,087 | 8/1869 | Clayton | 137—512.1 |
| 976,010 | 11/1910 | Thompson | 137—512.1 |

ALAN COHAN, *Primary Examiner.*